US012349056B2

(12) United States Patent
Lea et al.

(10) Patent No.: US 12,349,056 B2
(45) Date of Patent: *Jul. 1, 2025

(54) ACCESSORY DEVICE COMMUNICATION UTILIZING MULTIPLE PERSONALITIES

(71) Applicant: Microsoft Technology Licensing, LLC, Redmond, WA (US)

(72) Inventors: Perry Victor Lea, Eagle, ID (US); Krishna Kant Chintalapudi, Redmond, WA (US); Steven William Ranta, Seattle, WA (US); Gopala Srihari Narlanka, Bellevue, WA (US); Stanley William Adermann, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,932

(22) Filed: May 1, 2024

(65) Prior Publication Data

US 2024/0284319 A1    Aug. 22, 2024

Related U.S. Application Data

(63) Continuation of application No. 17/479,521, filed on Sep. 20, 2021, now Pat. No. 12,010,613.

(51) Int. Cl.
*H04W 48/18* (2009.01)
*H04W 72/563* (2023.01)
*H04W 76/15* (2018.01)

(52) U.S. Cl.
CPC ......... *H04W 48/18* (2013.01); *H04W 72/563* (2023.01); *H04W 76/15* (2018.02)

(58) Field of Classification Search
CPC ... H04W 48/18; H04W 72/563; H04W 76/15; A63F 13/235
(Continued)

(56) References Cited

U.S. PATENT DOCUMENTS

2017/0142201 A1* 5/2017 Holmes ................. A63F 13/355
2017/0325102 A1* 11/2017 Casebolt ................ H04W 72/20
(Continued)

FOREIGN PATENT DOCUMENTS

WO    2014190100 A1    11/2014

OTHER PUBLICATIONS

Ali, et al., "Design of MAC Layer Resource Allocation Schemes for IEEE 802.11ax: Future Directions", In Conference of IETE Technical Review, 35(1), Jun. 8, 2017, pp. 1-26.
(Continued)

*Primary Examiner* — Huy C Ho
(74) *Attorney, Agent, or Firm* — Rainier Patents, P.S.

(57) ABSTRACT

An electronic device includes a processor, a wireless communication device, and a hardware storage device. The hardware storage device has instructions stored thereon that, when executed by the processor, cause the electronic device to obtain a plurality of data channel personalities. Each of the data channel personalities includes a unique radio communication and network protocol for the wireless communication device. The instructions further cause the electronic device to select a data channel personality from the plurality of data channel personalities and transmit data to a host device using the wireless communication device and the radio communication and network protocol according to the selected data channel personality.

19 Claims, 4 Drawing Sheets

(58) Field of Classification Search
USPC .......................................................... 370/329
See application file for complete search history.

(56) References Cited

U.S. PATENT DOCUMENTS

| | | |
|---|---|---|
| 2019/0274171 A1 | 9/2019 | Viger et al. |
| 2021/0236917 A1* | 8/2021 | Palmer .................... G06F 3/017 |
| 2023/0123467 A1 | 4/2023 | Lea et al. |

OTHER PUBLICATIONS

Non Final Office Action Issued in U.S. Appl. No. 17/480,817, Mailed Date: Jan. 27, 2023, 18 Pages.
Notice of Allowance mailed on May 2, 2024, in U.S. Appl. No. 17/479,521, 7 pages.
Non-Final Office Action mailed on Feb. 12, 2025, in U.S. Appl. No. 18/621,870, 13 pages.
Notice of Allowance mailed on May 22, 2025, in U.S. Appl. No. 18/621,870, 07 pages.

* cited by examiner

ACCESSORY DEVICE COMMUNICATION UTILIZING MULTIPLE PERSONALITIES

CROSS REFERENCE TO RELATED APPLICATIONS

This application is a continuation of U.S. patent application Ser. No. 17/479,521, filed Sep. 20, 2021, which is hereby incorporated by reference in its entirety.

BACKGROUND

Background and Relevant Art

Accessory devices communicate with a host device to send and receive information from a host application. Accessory devices can be used with a plurality of host devices, and users may move the accessory device between locations to use while away from the home or office. Conventionally, accessory devices are paired and re-paired with new host devices each time they are used with a different host device. Some devices are able to advertise availability and pair with known devices, but only with a currently active radio of the accessory device.

BRIEF SUMMARY

In some embodiments, an electronic device includes a processor, a wireless communication device, and a hardware storage device. The hardware storage device has instructions stored thereon that, when executed by the processor, cause the electronic device to obtain a plurality of data channel personalities. Each of the data channel personalities includes a unique radio communication and network protocol for the wireless communication device. The instructions further cause the electronic device to select a data channel personality from the plurality of data channel personalities and transmit data to a host device using the wireless communication device and the radio communication and network protocol according to the selected data channel personality.

In some embodiments, a method of establishing a wireless communication between an accessory device and a host device includes obtaining a plurality of data channel personalities, automatically selecting a data channel personality from the plurality of data channel personalities without user input, and transmitting data to the host device using the wireless communication device and the radio communication and network protocol according to the selected data channel personality. Each of the data channel personalities includes a unique radio communication and network protocol for a wireless communication device of the accessory device.

In some embodiments, a method of establishing a wireless communication between an accessory device and a host device includes obtaining a plurality of data channel personalities, receiving a user input, selecting a data channel personality from the plurality of data channel personalities based on the user input, and transmitting data to the host device using the wireless communication device and the radio communication and network protocol according to the selected data channel personality. Each of the data channel personalities includes a unique radio communication and network protocol for a wireless communication device of the accessory device.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure generally relates to systems and methods for communicating data between an accessory device and plurality of host devices. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

Figure 1:
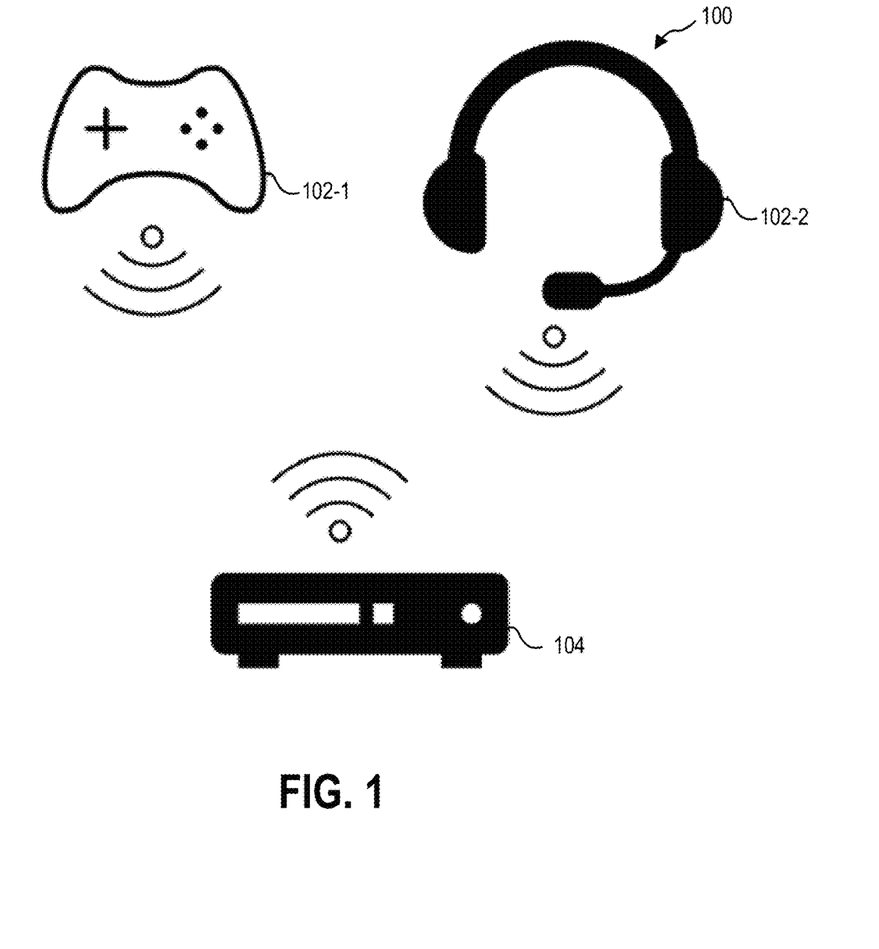
FIG. 1 is a schematic representation of a wireless communication system, according to at least some embodiments of the present disclosure.

FIG. 1 illustrates an example system 100 of accessory devices 102-1, 102-2 communicating with a host device 104. The accessory device 102-1, 102-2 may be configured to wirelessly communicate with a plurality of host devices 104 using different communication methods and stored data channel personalities for those different communication methods. Conventional accessory devices, such as game controllers, speakers, headsets, keyboards, joysticks, and other human interface devices (HID) pair to a host device and remain paired to the host device until paired to a different host device. Even accessory devices that allow pairing to host devices over different frequencies or protocols conventionally remain paired with a single host device until paired with a different host device.

Figure 2:
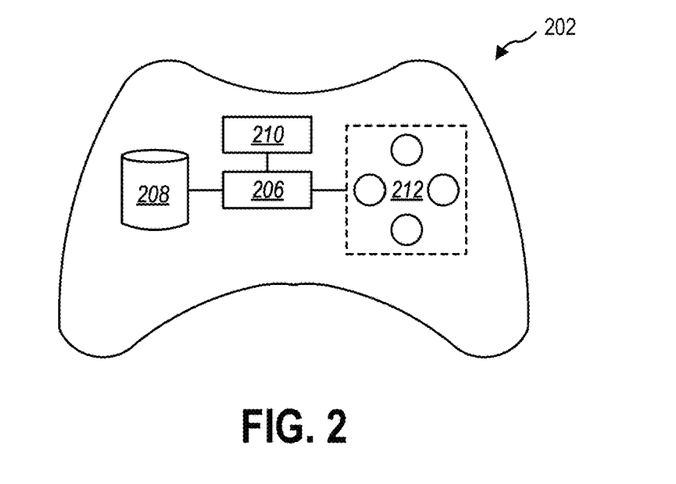
FIG. 2 is a schematic representation of an accessory device, according to at least some embodiments of the present disclosure.

In some embodiments, an accessory device 202 according to the present disclosure, such as a game controller illustrated in FIG. 2 has, stored thereon, a plurality of data channel personalities that allow the accessory device to selectively change a data channel from a first host device using a first transceiver and/or first protocol to a second host device using a second transceiver and/or second protocol.

The accessory device 202 includes a processor 206 in communication with a hardware storage device 208. The hardware storage device 208 can be any non-transient computer readable medium that may store instructions thereon. The hardware storage device 208 may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 208 includes instruction stored thereon that, when executed by the processor 206, cause the accessory device 202 to perform any method or part of a method described herein. The hardware storage device 208 or another hardware storage device has, stored thereon, at least one data channel personality.

The accessory device 202 further includes a network device 210, such as a radio frequency (RF) transceiver, that allows wireless transmission and receipt of data to the host device and/or control device. In some embodiments, the accessory device 202 has a plurality of network devices 210 that provide communication at different frequencies or power levels to communicate with different host devices and/or control devices.

The data channel provides communication of state data, audio data, and other frequent communications between the accessory device 202 and a host device. In some embodiments, the accessory device 202 also communicates via a control channel with a control application that provides instructions to the accessory device to change data channel personality. In some embodiments, the control channel may broadcast other device information to the control application, such as current or available stored data channel personalities, current battery status of the accessory device 202, RSSI signal strength, or other functions. In some embodiments, the accessory device has at least one input mechanism 212 locally on the accessory device to select, cycle through, or otherwise change the data channel personality.

Some examples of data channel personalities stored on the accessory device 202 include, but at not limited to Bluetooth or Bluetooth low energy (BLE), Wi-Fi 802.11ac, Wi-Fi 802.11n, Wi-Fi 802.11ax, or other wireless data communication protocol. For each of the wireless data communication protocols, one or more stored pairing information and/or credentials are stored on the accessory device 202. The accessory device 202 may, therefore, "remember" previously paired devices, allowing the transceiver of the accessory device to establish a data channel with the associated host device when a data channel personality is selected.

Figure 3:
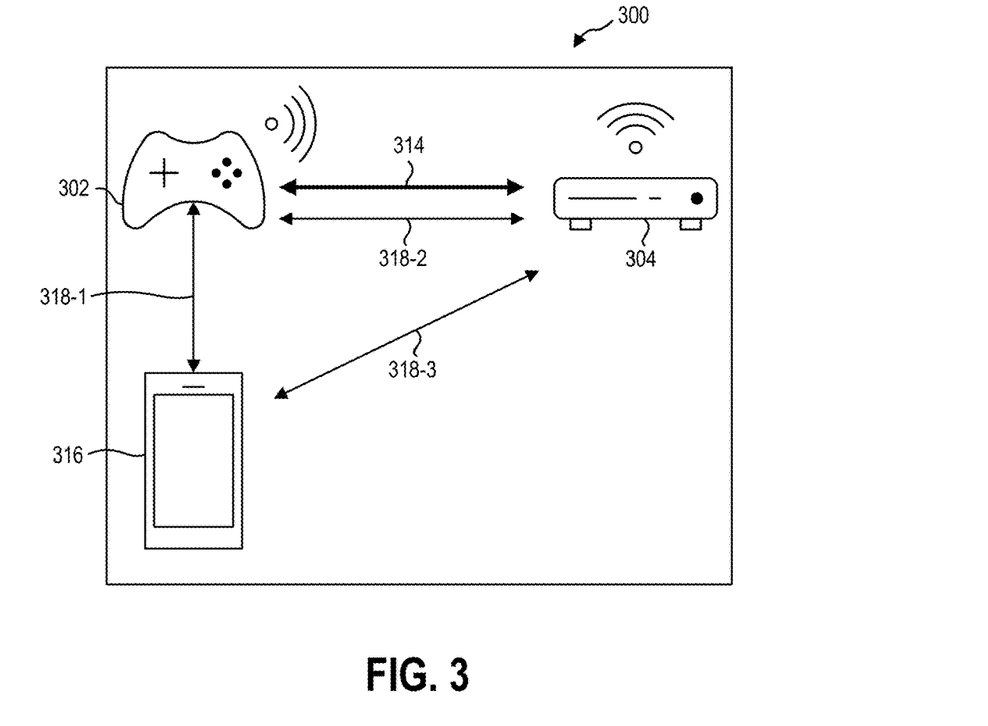
FIG. 3 is a schematic representation of wireless communication channels, according to at least some embodiments of the present disclosure.

Referring now to FIG. 3, in some embodiments, a system 300 includes an accessory device 302 in communication with a host device 304 by a data channel 314 and with a control device 316 via a first control channel 318-1. Other control channels 318-2, 318-3 may further allow device information to be communicated or shared between devices of the system 300. For example, a second control channel 318-2 between the accessory device 302 and the host device 304 may allow communication of device health and device status information between the accessory device 302 and the host device 304. A third control channel 318-3 between the control device 316 and the host device 304 may allow communication of device health and device status information between the control device 316 and the host device 304.

A data channel 314 includes real-time or substantially real-time communication between the accessory device 302 and the host device 304 to allow a user to interact with a host application executed by the host device 304, such as a game application running on a game console (e.g., MICROSOFT XBOX, SONY PLAYSTATION, NINTENDO SWITCH). The host application may be natively executed on the host device 304. The host application may be a streamed game application executed on a cloud server and accessed through an access point (the host device) to which the accessory device has a data channel. For example, a game controller may transmit controller state data to the host device 304 via the data channel 314 to interact with a game application running on or accessed through the host device 304. In other examples, a headset may receive audio data from the host device 304 via the data channel 314 to represent the sounds in a game environment. In yet other examples, a game controller with a headset connected thereto may transmit chat audio data from the headset through the game controller to the host device 304 via the data channel 314. In some embodiments, the data channel 314 allows for transmission of data between the accessory device 302 and host device 304 at least every 2 milliseconds.

A control channel 318-1, 318-2, 318-3 may allow non-latency-critical information to be transmitted between the accessory device 302 and a control application or device 316. In some embodiments, the control device 316 is different from the host device 304. For example, a control device 316 may be a user's smartphone that communicates with the accessory device 302 via the control channel 318-1 while the accessory device 302 communicates with a host device 304, such as a game console, via the data channel 314. In some embodiments, the control device 316 is the host device 304, and a control application is different from the host application with which the accessory device 302 communicates via the data channel 314. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In a particular embodiment, the accessory device is a game controller with a plurality of data channel personalities stored thereon. The game controller is in data communication with a control application running on a smartphone via a control channel. The control channel may be established using BLE between the game controller and the smartphone to target low bandwidth and latency-tolerant communication. The control channel allows the control application to send instructions to the game controller to select the game console data channel personality from the hardware storage device of the game controller. The game controller can then, via a Wi-Fi protocol such as 802.11n or 802.11ax, establish a data channel with the game console (i.e., host device) for a low-latency data connection to interact with the game application (or operating system or other application) running on the game console. The control channel may persist while the game controller changes data channel personalities and data channels with a plurality of host devices.

The data channel personality is changed by loading and transitioning the radio firmware, vendor radio firmware, and control firmware resident on the accessory device to the new personality. The radio firmware, vendor radio firmware, and control firmware associated with each data channel personality are stored locally on non-volatile memory on the accessory device.

In some embodiments, the data channel personalities use Wi-Fi, Bluetooth, and other RF frequencies. The data channel personalities may include a direct connection to a game console using 802.11n, a direct connection to a game console using 802.11ax, a Bluetooth connection using an isochronous data stream to a game console, PC, smartphone, or other computing device; a TCP/IP connection through an access point to a cloud datacenter, or other wireless data communication protocols. Only a single data channel personality is active at any time for reliable communication with the host device. Conversely, a plurality of control channels may be active at any time to allow communication of status information and/or latency tolerant data with the control device, the host device, and other devices.

Figure 4:
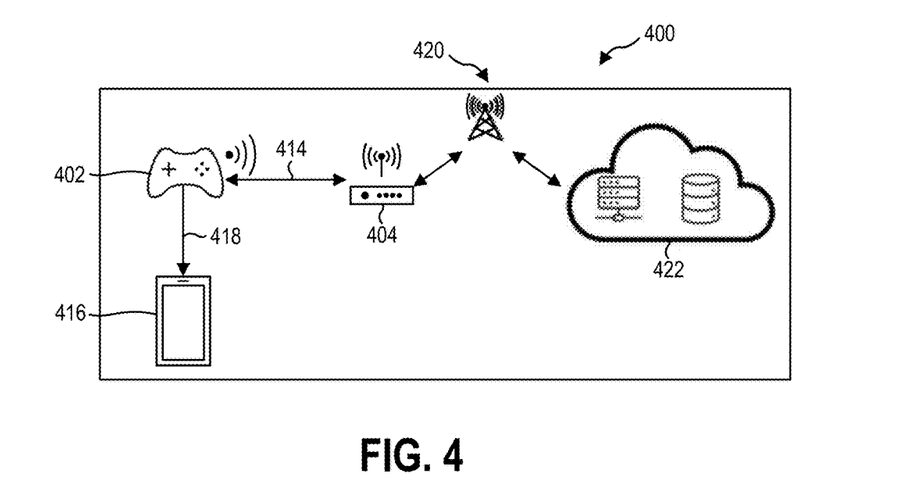
FIG. 4 is a schematic representation of another wireless communication system, according to at least some embodiments of the present disclosure.

In some embodiments, the accessory device 402 can interact with cloud-based services through an access point with a Wi-Fi connection, such as illustrated in FIG. 4. The accessory device 402 receives access point credentials and cloud-based service login credentials through the control channel 418 to a control application or control device 416. In a specific example, a game controller may receive access point credentials to establish a data channel 414 with a host device 404, such as a wireless access point, to access a cloud-based service 422 via a network 420. The game controller may also receive login credentials to associate the game controller with the user's account on the cloud-based service 422. In other examples, the accessory device 402 includes a screen and/or keyboard to allow manual input of the credentials and other information without the use of a control channel 418.

In a specific example, a game controller may establish a connection to the user's XBOX CLOUD GAMING account directly through an access point, reducing latency compared to communicating through, first a PC or smartphone, second an access point, and third to the XBOX CLOUD GAMING account. Similarly, a headset or other accessory device may connect directly to the XBOX CLOUD GAMING account and be associated with the same session through a direct connection through the access point. A cloud-direct data channel personality may use TCP/IP (Level 1 through 7 of the OSI stack) to communicate state data or receive audio or haptic information.

When this personality is enabled, the accessory device 402 may initially gather access point and credential information securely from a control channel 418 or through manual input into the accessory device 402 directly. The accessory device 402 will then attempt to pair with the access point host device 404 and XBOX CLOUD GAMING to securely attest itself and begin communication. To assist the user, when the Cloud-Direct personality is loaded, previously-stored SSID and access point credentials will be accessed from non-volatile storage on the accessory device 402 and used. This allows the user to re-connect without needed the initial control device 416 setup or manual input.

Figure 5:
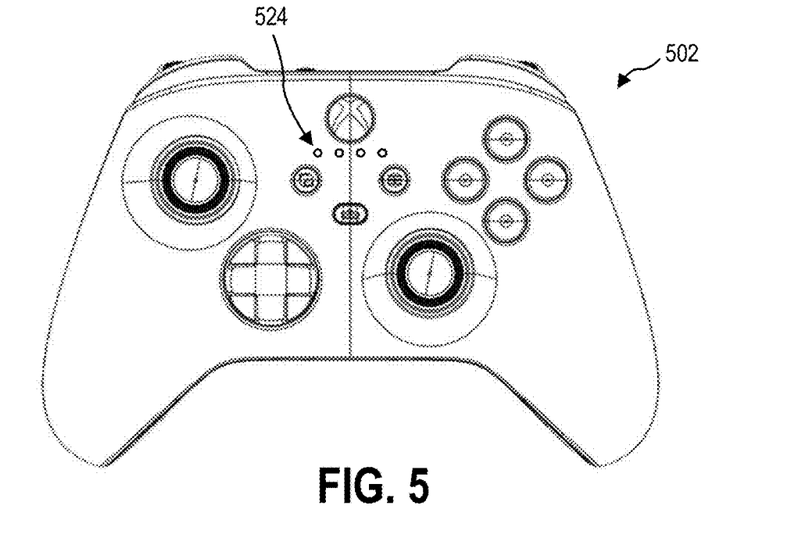
FIG. 5 is a front view of an accessory device, according to at least some embodiments of the present disclosure.

In some embodiments, a user views which data channel 414 personality is active on the accessory device 402 via the control application or control device 416. For example, a smartphone connected to the accessory device 402 via a control channel 418 may display the control application, which indicates which data channel 414 personality is active on the accessory device 402. Referring now to FIG. 5, in some embodiments, the accessory device 502 includes one or more status indicators to indicate to the user which data channel personality is active on the accessory device 502. For example, the accessory device 502 may include a plurality of status lights 524 on the accessory device 502 that are associated with different data channel personalities. The illuminated status light 524 may indicate the active data channel personality of the accessory device 502. In some embodiments, the status light 524 may illuminate with the associated data channel personality is selected and change color when a data channel is established with the host device. In at least one embodiment, the status light 524 may illuminate a first color, change to a second color upon establishing a data connection with an access point, and change a third color upon establishing a connection with a user's account on a cloud-based service through the access point. In at least another embodiment, the status light 524 may flash when a data channel personality is selected and turn solidly illuminated upon establishing a data connection with a host device. The status light 524 may then change color upon establishing a connection with a user's account on a cloud-based service through the access point.

Figure 6:
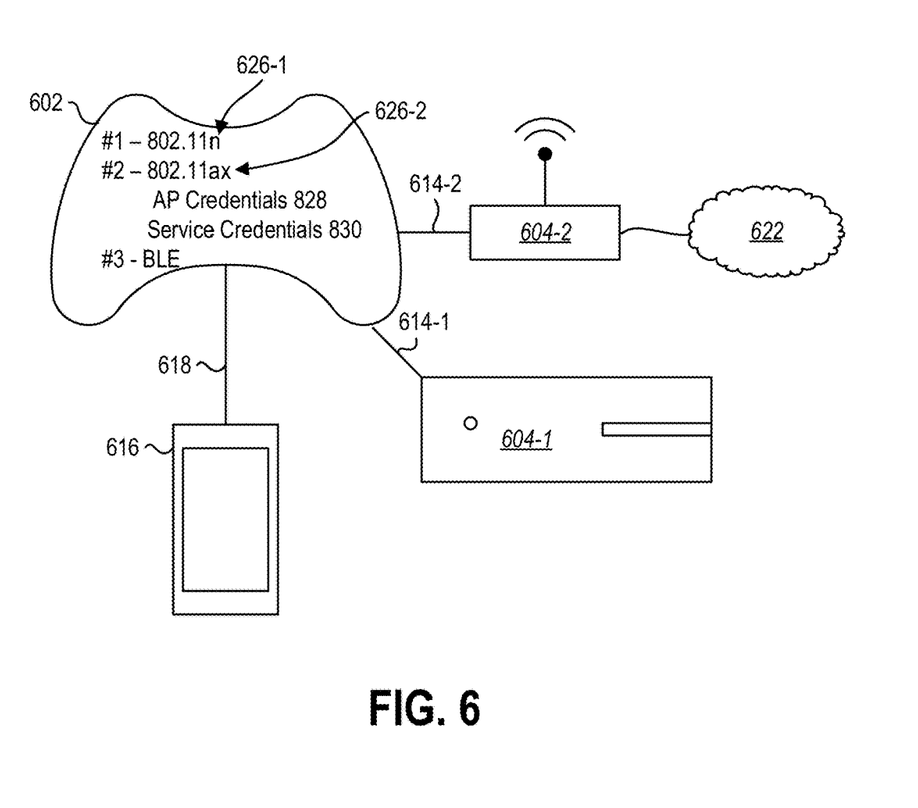
FIG. 6 is a schematic representation of selecting data channel personalities in an accessory device, according to at least some embodiments of the present disclosure.

FIG. 6 illustrates another embodiment of a system 600 according to the present disclosure. In some embodiments, the control device 616 and/or control application manages the data channel personality selection and/or management. The control device 616 and/or control application may allow the creation of a first data channel personality 626-1, such as creating a game console data channel 614-1 using 802.11n protocol. The details associated with the game console data channel 614-1 using 802.11n protocol may be stored locally on the accessory device 602. The control device 616 and/or control application may allow the creation of a second data channel personality 626-2, such as creating a cloud-direct data channel personality that includes SSID information, access point credentials, and cloud-based service credentials to access a cloud-based service 622 via a cloud service data channel 614-2 through a second host device 604-2 (e.g., access point). In some embodiments, the second data channel personality 626-2 may be the same protocol as the first data channel connection 626-1, such as pairing information to a different game console using the 802.11n protocol. The accessory device 602 can then precisely switch between data channels with different host devices with a similar communication protocol.

The control device 616 and/or control application may adjust the total number of available data channel personalities 626-1, 626-2. In another example, a first cloud-direct data channel personality may allow the accessory device to retain and reuse login credentials for a first cloud-based service and a second cloud-direct data channel personality may allow the accessory device to retain and reuse login credentials for a second cloud-based service. In other examples, a first cloud-direct data channel personality may allow the accessory device to retain and reuse first SSID and access point credential with login credentials to connect to a cloud-based service and a second cloud-direct data channel personality may allow the accessory device to retain and reuse second SSID and access point credentials with login credentials for the cloud-based service. The accessory device may then select different access points or frequencies of an access point to connect to the cloud-based service.

The control device 616 and/or control application may enable device pairing by providing a display and/or input mechanisms by which network or pairing information may be entered to the accessory device 602 over the control channel 618. For example, some devices require a code to be entered to confirm a pairing of devices over Bluetooth. In other examples, the SSID may be selected on a display of the control device 616, and a network passcode entered on a keyboard, to provide the accessory device 602 with the network information for a data channel 614-2 to an access point 604-2.

In some embodiments, the control device and/or control application includes a list of data channel personalities. The desired data channel personality may be selected from the list or through another selection mechanism to instruct the accessory device, via the control channel, to change the radio firmware, vendor radio firmware, and control firmware in system memory of the accessory device. In at least one example, user account information is stored on the control device and/or control application to provide greater security for the user's account. In the event that a game controller is lost, the game controller alone would not be able to connect to the user's cloud-based service account without the control device and/or control application, also.

In some embodiments, the accessory device allows data channel personality selection, cycling, or management by one or more manual inputs into buttons, switches, triggers, sticks, touch sensitive surfaces, or directional pads. For example, a sliding switch with four positions may select (and indicate) the active data channel personality on the accessory device. For example, a first position may select a first data channel personality (802.11n), a second position may select a second data channel personality (802.11ax), a third position may select a third data channel personality (Bluetooth data channel), and a fourth position may select a fourth data channel personality (Cloud-direct via access point).

Figure 7:
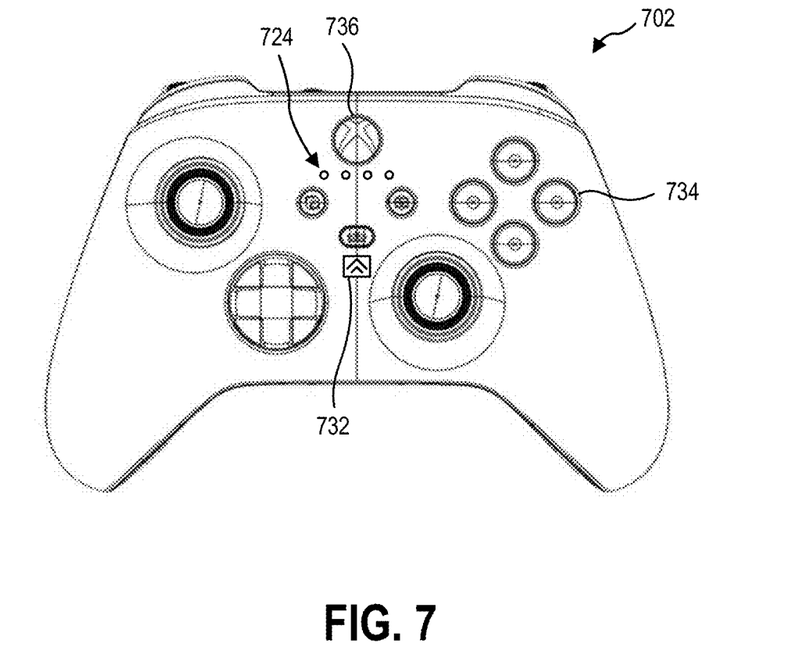
FIG. 7 is a front view of another accessory device, according to at least some embodiments of the present disclosure.

In other embodiments, the manual input may be to a personality button 732 on a face of the accessory device 702, such as illustrated in FIG. 7, where the personality button 732 cycles through stored data channel personalities, such as those created by the control device and/or control application. As described herein, a status light 724 or plurality of status lights may indicate the active data channel personality. In at least one example, a display screen of the accessory device 702 may display the active data channel personality.

In the example of a game controller, the manual input may include one or more of the digital input buttons 734 located on the game controller that are conventionally used for game inputs. For example, depressing the personality button 732 alone may cycle through stored data channel personalities, while depressing the personality button in combination with the "X" button may select the 802.11ax game console data channel personality. Different button combinations may select different data channel personalities. In at least one embodiment, the personality button 732 only changes the active data channel personality when depressed in combination with at least one other input button 734. For example, a system button 736 (e.g., the "Xbox button" or "PlayStation button" in the MICROSOFT XBOX ELITE SERIES 2 CONTROLLER or the SONY DUALSENSE CONTROLLER, respectively) may call up a top menu or operating system main screen when depressed alone, and the system button 736 may function as a personality button 732 when depressed in combination with another input button 734.

In some embodiments, the accessory device 702 selects the data channel personality automatically without explicit user input. In some embodiments, the control device and/or control application automatically sends instructions to the accessory device 702 to select a data channel personality automatically without explicit user input. The data channel personality may be automatically selected based on the information stored in or associated with the data channel personalities of the accessory device 702. In some embodiments, the accessory device 702 may store, in non-volatile memory, the last-used data channel personality and reload the last-used data channel personality.

Figure 8:
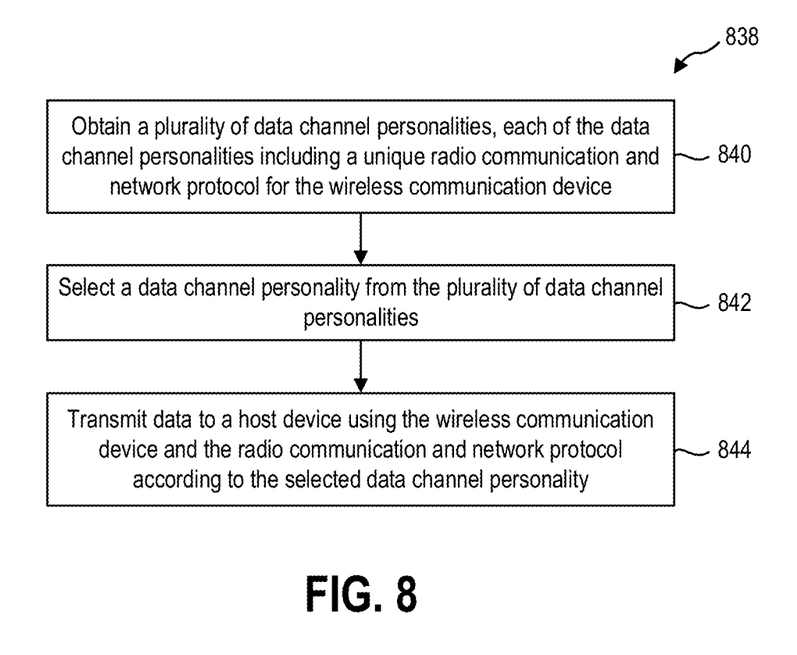
FIG. 8 is a flowchart illustrating a method of managing communication between an accessory device and a host device, according to at least some embodiments of the present disclosure.

FIG. 8 illustrates a method 838 of communicating between an accessory device and a host device by obtaining a plurality of data channel personalities at 840, wherein each of the data channel personalities includes a unique radio communication and network protocol for the wireless communication device of the accessory device. The plurality of data channel personalities may be obtained from the hardware storage device of the accessory device or provided to the system memory of the accessory device by a control device via a control channel.

The method 838 further includes selecting a data channel personality from the plurality of data channel personalities at 842 and loading the firmware into system memory associated with the selected data channel personality. The accessory device can then transmit data to a host device using the wireless communication device of the accessory device according to the selected data channel personality at 844. As described herein, the data channel personality may be selected at 842 through manual inputs on the accessory device or through selections made by user inputs to the control device or control application.

In some embodiments, a data channel personality may be automatically selected at 842 based on a recognized RF signal in the presence of the accessory device. The accessory device and/or control device may detect the presence of a known host device through advertising on the appropriate frequency. In the event only one known host device is present or detected, the accessory device may select that the associated data channel personality to establish the data channel with that host device. For example, a user may use a game controller at their home with a game console with a first data channel personality and at another location to play cloud-based games with a second data channel personality.

When a presence of the game console is detected by the accessory device and/or control device, the accessory device may select the first data channel personality, and when a presence of the known SSID stored in the cloud-direct data channel personality is detected, the accessory device may select the second data channel personality.

In some embodiments, the plurality of data channel personalities has a priority list of the data channel personalities. When the presence of more than one data channel personality is detected, the accessory device may select the first data channel personality, for example, when the accessory device is in proximity to a known game console, the accessory device may prioritize connection with the game console. An example of this would be when the user uses the game controller at their home with their home console and connects to an access point at a friend's house to play cloud-based games. In the event that the user brings their console to their friend's house, the game controller would detect both the game console and access point as potential host devices. The game controller would prioritize the data channel personality associated with the game console.

The data channel personality may be automatically selected based on a calculated proximity to a recognized RF signal when a plurality of recognized RF signals is present. The accessory device and/or the control device may determine a proximity to a host device based on the strength of an RF signal therebetween. For example, the accessory device may determine a distance to a known host device by establishing a wireless data connection with the host device and measuring a distance to the host device based on a round trip time or other distance measurement method. The accessory device and/or control device may automatically select a data channel personality based on the host device that is physically closest to the accessory device, inferring that the user intends to use the accessory device with host device closest to the accessory device. While host devices are in communication range with the accessory device, this method may be useful in automatically selecting the appropriate data channel personality between a 802.11ax data channel personality to connect to a game console in the user's living room and a BLE data channel personality to connect to a PC in the user's home office.

The data channel personality may be automatically selected based on the location of the accessory device and/or the control device. For example, the accessory device and/or control device may determine a physical location of the accessory device based on an IP address or a GPS location. In some embodiments, a first physical location of the accessory device may be associated with a cloud-direct data channel personality, and a second physical location of the accessory device is associated with a Wi-Fi-based game console data channel personality.

In some embodiments, the accessory device and/or control device (or control application) may use a combination of techniques described herein to automatically select a data channel personality. For example, the accessory device may have, stored thereon, a data channel personality associated with a BLE data channel with the user's smartphone (which may or may not be the control device). The user will commonly have their smartphone on their person or nearby, such that the smartphone is frequently the physically closest potential host device to the accessory device irrespective of where the user is using the accessory device. In such an example, the accessory device may automatically select a data channel personality based on proximity, presence, location, or other method except for automatically selecting the smartphone.

In at least one embodiment, the accessory device and/or the control device (or control application) automatically selects the data channel personality to be used based on one or more logic or machine learning (ML) models. For example, the accessory device and/or the control device (or control application) may record usage information for a data channel personality or for the accessory device, such as the identity of a user using the accessory device, the location of the accessory device and/or the control device during use, the duration of use, the time of day, day of the week, etc. The usage information may be provided to the one or more ML models and/or compared to an existing ML model to better predict the appropriate data channel personality to be selected. For example, the usage information may indicate that the user exclusively plays cloud-based games after 10:00 pm. In another example, the usage information may indicate that the user has never used the accessory device in the current physical location, and the accessory device or control device may select the cloud-direct data channel personality to load the appropriate radio firmware in anticipation of connecting to an access point for cloud-based services.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

INDUSTRIAL APPLICABILITY

The present disclosure generally relates to systems and methods for communicating data between an accessory device and plurality of host devices. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user.

The accessory device may be configured to wirelessly communicate with a plurality of host devices using different communication methods and stored data channel personalities for those different communication methods. Conventional accessory devices, such as game controllers, speakers, headsets, keyboards, joysticks, and other human interface devices (HID) pair to a host device and remain paired to the host device until paired to a different host device. Even accessory devices that allow pairing to host devices over different frequencies or protocols conventionally remain paired with a single host device until paired with a different host device.

In some embodiments, an accessory device according to the present disclosure has, stored thereon, a plurality of data channel personalities that allow the accessory device to selectively change a data channel from a first host device using a first transceiver and/or first protocol to a second host device using a second transceiver and/or second protocol. The data channel provides communication of state data, audio data, and other frequent communications between the accessory device and host device. In some embodiments, the accessory device also communicates via a control channel with a control application that provides instructions to the accessory device to change data channel personality. In some embodiments, the control channel may broadcast other device information to the control application, such as current or available stored data channel personalities, current battery status, RSSI signal strength, or other functions. In some embodiments, the accessory device has at least one input mechanism locally on the accessory device to select, cycle through, or otherwise change the data channel personality.

Some examples of data channel personalities stored on the accessory device include, but at not limited to Bluetooth or Bluetooth low energy (BLE), Wi-Fi 802.11ac, Wi-Fi 802.11n, Wi-Fi 802.11ax, or other wireless data communication protocol. For each of the wireless data communication protocols, one or more stored pairing information and/or credentials are stored on the accessory device. The accessory device may, therefore, "remember" previously paired devices, allowing the transceiver of the accessory device to establish a data channel with the associated host device when a data channel personality is selected.

In some embodiments, a data channel includes real-time or substantially real-time communication between the accessory device and the host device to allow a user to interact with a host application executed by the host device, such as a game application running on a game console (e.g., MICROSOFT XBOX, SONY PLAYSTATION, NINTENDO SWITCH). The host application may be natively executed on the host device. The host application may be a streamed game application executed on a cloud server and accessed through an access point (the host device) to which the accessory device has a data channel. For example, a game controller may transmit controller state data to the host device via the data channel to interact with a game application running on or accessed through the host device. In other examples, a headset may receive audio data from the host device via the data channel to represent the sounds in a game environment. In yet other examples, a game controller with a headset connected thereto may transmit chat audio data from the headset through the game controller to the host device via the data channel. In some embodiments, the data channel allows for transmission of data between the accessory device and host device at least every 2 milliseconds.

A control channel may allow non-latency-critical information to be transmitted between the accessory device and a control application or device. In some embodiments, the control device is different from the host device. For example, a control device may be a user's smartphone that communicates with the accessory device via the control channel while the accessory device communicates with a game console via the data channel. In some embodiments, the control device is the host device, and a control application is different from the host application with which the accessory device communicates via the data channel. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In a particular embodiment, the accessory device is a game controller with a plurality of data channel personalities stored thereon. The game controller is in data communication with a control application running on a smartphone via a control channel. The control channel may be established using BLE between the game controller and the smartphone to target low bandwidth and latency-tolerant communication. The control channel allows the control application to send instructions to the game controller to select the game console data channel personality from the hardware storage device of the game controller. The game controller can then, via a Wi-Fi protocol such as 802.11n or 802.11ax, establish a data channel with the game console (i.e., host device) for a low-latency data connection to interact with the game application (or operating system or other application) running on the game console. The control channel may persist while the game controller changes data channel personalities and data channels with a plurality of host devices.

The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media.

The data channel personality is changed by loading and transitioning the radio firmware, vendor radio firmware, and control firmware resident on the accessory device to the new personality. The radio firmware, vendor radio firmware, and control firmware associated with each data channel personality are stored locally on non-volatile memory on the accessory device.

In some embodiments, the data channel personalities use Wi-Fi, Bluetooth, and other RF frequencies. The data channel personalities may include a direct connection to a game console using 802.11n, a direct connection to a game console using 802.11ax, a Bluetooth connection using an isochronous data stream to a game console, PC, smartphone, or other computing device; a TCP/IP connection through an access point to a cloud datacenter, or other wireless data communication protocols. Only a single data channel personality is active at any time for reliable communication with the host device. Conversely, a plurality of control channels may be active at any time to allow communication of status information and/or latency tolerant data with the control device, the host device, and other devices.

In some embodiments, the accessory device can interact with cloud-based services through an access point with a Wi-Fi connection. The accessory device receives access point credentials and cloud-based service login credentials through the control channel to a control application or control device. In a specific example, a game controller may receive access point credentials to establish a data channel with a wireless router to access a cloud-based service. The game controller may also receive login credentials to associate the game controller with the user's account on the cloud-based service. In other examples, the accessory device includes a screen and/or keyboard to allow manual input of the credentials and other information without the use of a control channel.

In a specific example, a game controller may establish a connection to the user's XBOX CLOUD GAMING account directly through an access point, reducing latency compared to communicating through, first a PC or smartphone, second an access point, and third to the XBOX CLOUD GAMING account. Similarly, a headset or other accessory device may connect directly to the XBOX CLOUD GAMING account and be associated with the same session through a direct connection through the access point. A cloud-direct data channel personality may use TCP/IP (Level 1 through 7 of the OSI stack) to communicate state data or receive audio or haptic information.

When this personality is enabled, the game controller may initially gather access point and credential information securely from control channel or through manual input into the game controller directly. The game controller will then attempt to pair with the access point and XBOX CLOUD GAMING to securely attest itself and begin communication. To assist the user, when the Cloud-Direct personality is loaded, previously-stored SSID and access point credentials will be accessed from non-volatile storage on the accessory device and used. This allows the user to re-connect without needed the initial smartphone application or manual input.

In some embodiments, a user views which data channel personality is active on the accessory device via the control application or control device. For example, a smartphone connected to the accessory device via a control channel may display the control application, which indicates which data channel personality is active on the accessory device. In some embodiments, the accessory device includes one or more status indicators to indicate to the user which data channel personality is active on the accessory device. For example, the accessory device may include a plurality of status lights on the accessory device that are associated with different data channel personalities. The illuminated status light may indicate the active data channel personality of the accessory device. In some embodiments, the status light may illuminate with the associated data channel personality is selected and change color when a data channel is established with the host device. In at least one embodiment, the status light may illuminate a first color, change to a second color upon establishing a data connection with an access point, and change a third color upon establishing a connection with a user's account on a cloud-based service through the access point. In at least another embodiment, the status light may flash when a data channel personality is selected and turn solidly illuminated upon establishing a data connection with a host device. The status light may then change color upon establishing a connection with a user's account on a cloud-based service through the access point.

In some embodiments, the control device and/or control application manages the data channel personality selection and/or management. The control device and/or control application may allow the creation of a first data channel personality, such as creating a game console connection using 802.11n protocol. The details associated with the game console connection using 802.11n protocol may be stored locally on the accessory device. The control device and/or control application may allow the creation of a second data channel personality, such as creating a cloud-direct data channel personality that includes SSID information, access point credentials, and cloud-based service credentials. In some embodiments, the second data channel personality may be the same protocol as the first data channel connection, such as pairing information to a different game console using the 802.11n protocol. The accessory device can then precisely switch between data channels with different host devices with a similar communication protocol.

The control device and/or control application may adjust the total number of available data channel personalities. In another example, a first cloud-direct data channel personality may allow the accessory device to retain and reuse login credentials for a first cloud-based service and a second cloud-direct data channel personality may allow the accessory device to retain and reuse login credentials for a second cloud-based service. In other examples, a first cloud-direct data channel personality may allow the accessory device to retain and reuse first SSID and access point credential with login credentials to connect to a cloud-based service and a second cloud-direct data channel personality may allow the accessory device to retain and reuse second SSID and access point credentials with login credentials for the cloud-based service. The accessory device may then select different access points or frequencies of an access point to connect to the cloud-based service.

The control device and/or control application may enable device pairing by providing a display and/or input mechanisms by which network or pairing information may be entered to the accessory device. For example, some devices require a code to be entered to confirm a pairing of devices over Bluetooth. In other examples, the SSID may be selected on a display of the control device, and a network passcode entered on a keyboard, to provide the accessory device with the network information for a data channel to an access point.

In some embodiments, the control device and/or control application includes a list of data channel personalities. The desired data channel personality may be selected from the list or through another selection mechanism to instruct the accessory device, via the control channel, to change the radio firmware, vendor radio firmware, and control firmware in system memory of the accessory device. In at least one example, user account information is stored on the control device and/or control application to provide greater security for the user's account. In the event that a game controller is lost, the game controller alone would not be able to connect to the user's cloud-based service account without the control device and/or control application, also.

In some embodiments, the accessory device allows data channel personality selection, cycling, or management by one or more manual inputs into touch sensitive surfaces, buttons, switches, triggers, sticks, or directional pads. For example, a sliding switch with four positions may select (and indicate) the active data channel personality on the accessory device. For example, a first position may select a first data channel personality (802.11n), a second position may select a second data channel personality (802.11ax), a third position may select a third data channel personality (Bluetooth data channel), and a fourth position may select a fourth data channel personality (Cloud-direct via access point).

In other embodiments, the manual input may be to a personality button on a face of the accessory device, where the personality button cycles through stored data channel personalities, such as those created by the control device and/or control application. As described herein, a status light or plurality of status lights may indicate the active data channel personality. In at least one example, a display screen of the accessory device may display the active data channel personality.

In the example of a game controller, the manual input may include one or more of the digital input buttons located on the game controller that are conventionally used for game inputs. For example, depressing the personality button alone may cycle through stored data channel personalities, while depressing the personality button in combination with the "X" button may select the 802.11ax game console data channel personality. Different button combinations may select different data channel personalities. In at least one embodiment, the personality button only changes the active data channel personality when depressed in combination with at least one other button. For example, a system button (e.g., the "Xbox button" or "PlayStation button" in the MICROSOFT XBOX ELITE SERIES 2 CONTROLLER or the SONY DUALSENSE CONTROLLER, respectively) may call up a top menu or operating system main screen when depressed alone, and the system button may function as a personality button when depressed in combination with another button.

In some embodiments, the accessory device selects the data channel personality automatically without explicit user input. In some embodiments, the control device and/or control application automatically sends instructions to the accessory device to select a data channel personality automatically without explicit user input. The data channel personality may be automatically selected based on the information stored in or associated with the data channel personalities of the accessory device. In some embodiments, the accessory device may store, in non-volatile memory, the last-used data channel personality and reload the last-used data channel personality.

In some embodiments, a data channel personality may be automatically selected based on a recognized RF signal in the presence of the accessory device. The accessory device and/or control device may detect the presence of a known host device through advertising on the appropriate frequency. In the event only one known host device is present or detected, the accessory device may select that the associated data channel personality to establish the data channel with that host device. For example, a user may use a game controller at their home with a game console with a first data channel personality and at another location to play cloud-based games with a second data channel personality. When a presence of the game console is detected by the accessory device and/or control device, the accessory device may select the first data channel personality, and when a presence of the known SSID stored in the cloud-direct data channel personality is detected, the accessory device may select the second data channel personality.

In some embodiments, the plurality of data channel personalities has a priority list of the data channel personalities. When the presence of more than one data channel personality is detected, the accessory device may select the first data channel personality, for example, when the accessory device is in proximity to a known game console, the accessory device may prioritize connection with the game console. An example of this would be when the user uses the game controller at their home with their home console and connects to an access point at a friend's house to play cloud-based games. In the event that the user brings their console to their friend's house, the game controller would detect both the game console and access point as potential host devices. The game controller would prioritize the data channel personality associated with the game console.

The data channel personality may be automatically selected based on a calculated proximity to a recognized RF signal when a plurality of recognized RF signals is present. The accessory device and/or the control device may determine a proximity to a host device based on the strength of an RF signal therebetween. For example, the accessory device may determine a distance to a known host device by establishing a wireless data connection with the host device and measuring a distance to the host device based on a round trip time or other distance measurement method. The accessory device and/or control device may automatically select a data channel personality based on the host device that is physically closest to the accessory device, inferring that the user intends to use the accessory device with host device closest to the accessory device. While host devices are in communication range with the accessory device, this method may be useful in automatically selecting the appropriate data channel personality between a 802.11ax data channel personality to connect to a game console in the user's living room and a BLE data channel personality to connect to a PC in the user's home office.

The data channel personality may be automatically selected based on the location of the accessory device and/or the control device. For example, the accessory device and/or control device may determine a physical location of the accessory device based on an IP address or a GPS location. In some embodiments, a first physical location of the accessory device may be associated with a cloud-direct data channel personality, and a second physical location of the accessory device is associated with a Wi-Fi-based game console data channel personality.

In some embodiments, the accessory device and/or control device (or control application) may use a combination of techniques described herein to automatically select a data channel personality. For example, the accessory device may have, stored thereon, a data channel personality associated with a BLE data channel with the user's smartphone (which may or may not be the control device). The user will commonly have their smartphone on their person or nearby, such that the smartphone is frequently the physically closest potential host device to the accessory device irrespective of where the user is using the accessory device. In such an example, the accessory device may automatically select a data channel personality based on proximity, presence, location, or other method except for automatically selecting the smartphone.

In at least one embodiment, the accessory device and/or the control device (or control application) automatically selects the data channel personality to be used based on one or more logic or machine learning (ML) models. For example, the accessory device and/or the control device (or control application) may record usage information for a data channel personality or for the accessory device, such as the identity of a user using the accessory device, the location of the accessory device and/or the control device during use, the duration of use, the time of day, day of the week, etc. The usage information may be provided to the one or more ML models and/or compared to an existing ML model to better predict the appropriate data channel personality to be selected. For example, the usage information may indicate that the user exclusively plays cloud-based games after 10:00 pm. In another example, the usage information may indicate that the user has never used the accessory device in the current physical location, and the accessory device or control device may select the cloud-direct data channel personality to load the appropriate radio firmware in anticipation of connecting to an access point for cloud-based services.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

The present disclosure relates to systems and methods for communicating data between an accessory device and plurality of host devices according to at least the examples provided in the sections below:

[A1] In some embodiments, an electronic device includes a processor, a wireless communication device, and a hardware storage device. The hardware storage device has instructions stored thereon that, when executed by the processor, cause the electronic device to obtain a plurality of data channel personalities. Each of the data channel personalities includes a unique radio communication and network protocol for the wireless communication device. The instructions further cause the electronic device to select a data channel personality from the plurality of data channel personalities and transmit data to a host device using the wireless communication device and the radio communication and network protocol according to the selected data channel personality.

[A2] In some embodiments, the electronic device of [A1] includes a user input device in communication with the processor, and the data includes state data of the user input device.

[A3] In some embodiments, the electronic device of [A1] or [A2] is a game controller.

[A4] In some embodiments, the host device of any of [A1] through [A3] is an access point. At least one of the data channel personalities includes stored SSID and network credentials to connect a data channel to the access point.

[A5] In some embodiments, the host device of any of [A1] through [A3] is a computing device. At least one of the data channel personalities includes stored Bluetooth credentials to connect a data channel to the computing device.

[A6] In some embodiments, the host device of any of [A1] through [A3] is a game console. At least one of the data channel personalities includes stored Wi-Fi credentials to connect to the game console.

[A7] In some embodiments, at least one of the data channel personalities of [A6] includes using a 802.11ax-based protocol.

[A8] In some embodiments, the electronic device of [A7] includes a second data channel personality of the plurality of data channel personalities. The second data channel personality includes stored Wi-Fi credentials to connect to the game console and uses a 802.11n-based protocol.

[A9] In some embodiments, the plurality of data channel personalities is stored on the hardware storage device of any of [A1] through [A8].

[A10] In some embodiments, at least two of the plurality of data channel personalities of any of [A1] through [A9] use the same communication protocol.

[A11] In some embodiments, the plurality of data channel personalities of any of [A1] through [A10] include at least a Wi-Fi data channel personality for connecting to a game console, a Bluetooth data channel personality for connecting to a computing device, and a Cloud Direct data channel personality for connecting to an access point and a cloud-based game streaming service.

[B1] In some embodiments, a method of establishing a wireless communication between an accessory device and a host device includes obtaining a plurality of data channel personalities, automatically selecting a data channel personality from the plurality of data channel personalities without user input, and transmitting data to the host device using the wireless communication device and the radio communication and network protocol according to the selected data channel personality. Each of the data channel personalities includes a unique radio communication and network protocol for a wireless communication device of the accessory device.

[B2] In some embodiments, automatically selecting the data channel personality in [B1] includes determining a distance from the accessory device to at least one known host device associated with a data channel personality of the plurality of the data channel personalities, and selecting the data channel personality associated with the host device physically closest to the accessory device.

[B3] In some embodiments, selecting the data channel personality associated with the host device physically closest to the accessory device in [B2] includes ignoring a second known host device that is physically closest to the accessory device and the data channel personality associated with the host device physically second closest to the accessory device.

[B4] In some embodiments, automatically selecting the data channel personality in [B1] includes detecting a presence of at least one known host device associated with a data channel personality of the plurality of the data channel personalities, and selecting the data channel personality associated with the host device detected in the presence of the accessory device.

[B5] In some embodiments, at least one of the data channel personalities is not automatically selected when the associated known host device is detected in [B4].

[C1] In some embodiments, a method of establishing a wireless communication between an accessory device and a host device includes obtaining a plurality of data channel personalities, receiving a user input, selecting a data channel personality from the plurality of data channel personalities based on the user input, and transmitting data to the host device using the wireless communication device and the radio communication and network protocol according to the selected data channel personality. Each of the data channel personalities includes a unique radio communication and network protocol for a wireless communication device of the accessory device.

[C2] In some embodiments, the user input of [C1] is received by a control device and transmitted to the accessory device via a control channel.

[C3] In some embodiments, the user input of [C1] is received with the accessory device.

[C4] In some embodiments, the accessory device of [C3] is a game controller and the user input is received by at least one input button on the game controller.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic device comprising:
    a processor;
    a wireless communication device in data communication with the processor;
    a hardware storage device in data communication with the processor, the hardware storage device having instructions stored thereon that, when executed by the processor, cause the electronic device to:
    obtain a plurality of data channel personalities stored on the hardware storage device, wherein a first data channel personality of the plurality of data channel personalities includes a first radio communication and network protocol and a second data channel personality utilizes a second radio communication and network protocol different from the first radio communication and network protocol;
    select the second data channel personality from the plurality of data channel personalities;
    change the wireless communication device from the first radio communication and network protocol of the first data channel personality to the second radio communication and network protocol by changing firmware of the wireless communication device; and
    transmit data to a host device using the wireless communication device and the second radio communication and network protocol according to the second data channel personality.

2. The electronic device of claim 1, further comprising a user input device in communication with the processor, and the data includes state data of the user input device.

3. The electronic device of claim 1, wherein the data includes audio data.

4. The electronic device of claim 1, wherein the host device is an access point and at least one of the data channel personalities includes stored SSID and network credentials to connect a data channel to the access point.

5. The electronic device of claim 1, wherein the host device is a computing device and at least one of the data channel personalities includes stored Bluetooth credentials to connect a data channel to the computing device.

6. The electronic device of claim 1, wherein the host device is a game console and at least one of the data channel personalities includes stored Wi-Fi credentials to connect to the game console.

7. The electronic device of claim 6, wherein at least one of the data channel personalities includes using a 802.11ax-based protocol.

8. The electronic device of claim 7, wherein the second data channel personality of the plurality of data channel personalities includes stored Wi-Fi credentials to connect to the game console and uses a 802.11n-based protocol.

9. The electronic device of claim 1, wherein at least two of the plurality of data channel personalities use the same communication protocol.

10. The electronic device of claim 1, wherein the plurality of data channel personalities includes at least:
- a Wi-Fi data channel personality for connecting to a game console;
- a Bluetooth data channel personality for connecting to a computing device; and
- a Cloud Direct data channel personality for connecting to an access point and a cloud-based game streaming service.

11. A method of establishing wireless communication between an accessory device and a host device, the method including:
- obtaining a plurality of data channel personalities, wherein a first data channel personality of the plurality of data channel personalities includes a first radio communication and network protocol and a second data channel personality utilizes a second radio communication and network protocol different from the first radio communication and network protocol;
- automatically selecting the second data channel personality from the plurality of data channel personalities without user input;
- changing a wireless communication device of the accessory device from the first radio communication and network protocol of the first data channel personality to the second radio communication and network protocol by changing firmware of the wireless communication device; and
- transmitting data to the host device using the wireless communication device and the second radio communication and network protocol according to the second data channel personality.

12. The method of claim 11, wherein automatically selecting the second data channel personality includes:
- determining a distance from the accessory device to at least one known host device associated with a corresponding data channel personality of the plurality of the data channel personalities, and
- in at least one instance, selecting the second data channel personality based on the second data channel personality being associated with a particular host device that is physically closest to the accessory device.

13. The method of claim 12, wherein selecting the second data channel personality comprises:
- in at least one other instance, ignoring a second known host device that is physically closest to the accessory device and selecting the second data channel personality based on the second data channel personality being associated with another host device that is physically second closest to the accessory device.

14. The method of claim 11, wherein automatically selecting the second data channel personality includes:
- detecting a presence of at least one known host device, and
- selecting the second data channel personality based on the second data channel personality being associated with the at least one known host device detected in the presence of the accessory device.

15. The method of claim 14, wherein at least one of the data channel personalities is not automatically selected when the associated known host device is detected.

16. A method of establishing wireless communication between an accessory device and a host device, the method including:
- obtaining a plurality of data channel personalities stored on a hardware storage device of the accessory device, each of the data channel personalities including a unique radio communication and network protocol for a wireless communication device of the accessory device;
- receiving a user input at the accessory device;
- selecting a selected data channel personality from the plurality of data channel personalities stored on the hardware storage device based on the user input;
- loading firmware associated with the selected data channel personality to the wireless communication device; and
- transmitting data from the accessory device to the host device using the wireless communication device and a selected radio communication and network protocol according to the selected data channel personality.

17. The method of claim 16, wherein the user input is received by a control device and transmitted to the accessory device via a control channel.

18. The method of claim 16, wherein the user input is received with the accessory device.

19. The method of claim 18, wherein the accessory device is a game controller, and the user input is received by at least one input button on the game controller.

* * * * *